US009327986B2

(12) United States Patent
Guyomarc'h

(10) Patent No.: US 9,327,986 B2
(45) Date of Patent: May 3, 2016

(54) METHOD FOR RECYCLING CARBON DIOXIDE $CO_2$

(75) Inventor: Raymond François Guyomarc'h, Caussade (FR)

(73) Assignee: SEE—Soluções, Energia e Meio Ambiente Ltda., São Paulo-SP (BR)

( * ) Notice: Subject to any disclaimer, the term of this patent is extended or adjusted under 35 U.S.C. 154(b) by 384 days.

(21) Appl. No.: 13/576,639

(22) PCT Filed: Jan. 17, 2011

(86) PCT No.: PCT/BR2011/000019
§ 371 (c)(1),
(2), (4) Date: Aug. 1, 2012

(87) PCT Pub. No.: WO2011/091495
PCT Pub. Date: Aug. 4, 2011

(65) Prior Publication Data
US 2012/0304661 A1      Dec. 6, 2012

(30) Foreign Application Priority Data
Feb. 1, 2010    (FR) ...................................... 10 00376

(51) Int. Cl.
*C01B 31/18*      (2006.01)
*F02C 3/22*       (2006.01)
*C10J 3/22*       (2006.01)

(52) U.S. Cl.
CPC . *C01B 31/18* (2013.01); *C10J 3/22* (2013.01); *C10J 2300/092* (2013.01);
(Continued)

(58) Field of Classification Search
CPC ................. C10J 2300/0969; C10J 2300/0946; C10J 3/22; C10J 2300/0916; C10J 2300/092; C10J 2300/1603; C01B 31/18
See application file for complete search history.

(56) References Cited

U.S. PATENT DOCUMENTS

| | | |
|---|---|---|
| 1,163,922 A | 12/1915 | Hillhouse |
| 2,128,262 A | 8/1938 | Newman |

(Continued)

FOREIGN PATENT DOCUMENTS

| | | |
|---|---|---|
| EP | 1 136 542 A1 | 9/2001 |
| EP | 1 933 087 A2 | 6/2008 |

(Continued)

OTHER PUBLICATIONS

Centi et al., "Opportunities and prospects in the chemical recycling of carbon dioxide to fuels," Catalyst Today (2009) 148:191-205.
(Continued)

*Primary Examiner* — Stanley Silverman
*Assistant Examiner* — Syed Iqbal
(74) *Attorney, Agent, or Firm* — Volpe and Koenig, P.C.

(57) ABSTRACT

The invention refers to a recycling process of a so-called gaseous flow (106) of $CO_2$ essentially containing molecules of $CO_2$, said process comprising the following steps:

heating of said gaseous flow of $CO_2$ at a pyrolysis temperature of the material containing carbon (104);

pyrolysis of a load of a carbon-containing material (104) containing elements of carbon by said gaseous flow, said pyrolysis reducing the molecules of $CO_2$ by said elements of carbon to produce a first gaseous flow (110) essentially containing molecules of carbon monoxide (CO) at high temperature;

oxidation of said molecules of carbon monoxide (CO) by elements of oxygen (O), said oxidation producing a second gaseous flow (114) essentially containing molecules of $CO_2$;

reduction of said molecules of $CO_2$ of said second gaseous flow (114), said reduction supplying a third gaseous flow (120) essentially containing molecules of carbon monoxide (CO).

It also refers to a system to perform such a process.

6 Claims, 1 Drawing Sheet

(52) U.S. Cl.
CPC . *C10J 2300/0916* (2013.01); *C10J 2300/0946* (2013.01); *C10J 2300/0969* (2013.01); *C10J 2300/1603* (2013.01)

(56) References Cited

U.S. PATENT DOCUMENTS

| | | | |
|---|---|---|---|
| 2,602,809 A | | 7/1952 | Dickinson |
| 2,656,255 A | | 10/1953 | Johnson |
| 2,772,954 A | | 12/1956 | Lequier |
| 2,864,688 A | * | 12/1958 | Reed ................ 75/450 |
| 3,031,287 A | | 4/1962 | Benson et al. |
| 3,201,215 A | | 8/1965 | Negra et al. |
| 3,442,620 A | | 5/1969 | Huebler et al. |
| 3,915,840 A | | 10/1975 | Gladrow et al. |
| 4,040,976 A | * | 8/1977 | Greene ............ 252/373 |
| 4,070,160 A | | 1/1978 | Cottle |
| 4,265,868 A | | 5/1981 | Kamody |
| 4,272,555 A | | 6/1981 | Davis et al. |
| 4,343,624 A | | 8/1982 | Belke et al. |
| 4,382,915 A | | 5/1983 | Sadhukhan et al. |
| 4,725,381 A | | 2/1988 | Pinto |
| 5,213,587 A | | 5/1993 | Ekström et al. |
| 6,444,179 B1 | | 9/2002 | Sederquist |
| 6,648,949 B1 | | 11/2003 | Der et al. |
| 7,494,574 B2 | | 2/2009 | Kong et al. |
| 7,780,749 B2 | | 8/2010 | Kulkarni et al. |
| 2002/0127178 A1 | | 9/2002 | Kindig et al. |
| 2004/0009378 A1 | | 1/2004 | Lightner |
| 2004/0123601 A1 | | 7/2004 | Fan |
| 2005/0175533 A1 | | 8/2005 | Thomas et al. |
| 2006/0130401 A1 | | 6/2006 | Giglio et al. |
| 2008/0078122 A1 | | 4/2008 | Clark |
| 2008/0134579 A1 | | 6/2008 | Kulkarni et al. |
| 2008/0184621 A1 | | 8/2008 | Clark |
| 2009/0049748 A1 | | 2/2009 | Day et al. |
| 2009/0126271 A1 | | 5/2009 | Kyo et al. |
| 2009/0148927 A1 | | 6/2009 | Schroeder et al. |
| 2009/0211444 A1 | | 8/2009 | Lissianski et al. |
| 2010/0132633 A1 | | 6/2010 | Liu et al. |
| 2010/0293845 A1 | | 11/2010 | Zeman et al. |
| 2011/0303875 A1 | | 12/2011 | Hoteit et al. |
| 2012/0171588 A1 | * | 7/2012 | Fan et al. ................ 429/418 |

FOREIGN PATENT DOCUMENTS

| | | |
|---|---|---|
| GB | 521 415 | 5/1940 |
| GB | 757 333 | 9/1956 |
| GB | 2 125 430 A | 3/1984 |
| JP | H06 319520 A | 11/1994 |
| JP | H10 259384 A | 9/1998 |
| JP | 2002 173301 A | 6/2002 |
| JP | 2006 008872 A | 1/2006 |
| JP | 2009 242248 A | 10/2009 |
| WO | 01/68789 A1 | 9/2001 |
| WO | 2004/067933 A2 | 8/2004 |
| WO | 2005/003632 A1 | 1/2005 |
| WO | 2007/082089 A2 | 7/2007 |
| WO | 2008/036902 A2 | 3/2008 |
| WO | 2008/097691 A1 | 8/2008 |
| WO | 2009/055829 A1 | 4/2009 |

OTHER PUBLICATIONS

Kong et al., "Hydrogen Production from Biomass Wastes by Hydrothermal Gasification," Energy Sources, Part A, 30:1166-1178, 2008.

Patterson, deceased, "A French-English Dictionary for Chemists," Second Edition (copyright 1954).

Mimori et al., "A New Reversible Chemical System for Efficient Utilization Of Carbonaceous Compounds," Energy vol. 19, No. 7, pp. 771-778, 1994.

Rezvani et al., "Comparative assessment of coal fired IGCC systems with CO2 capture using physical absorption, membrane reactors and chemical looping," Fuel 88 (2009) 2463-2472.

Li et al., "Clean coal conversion processes—progress and challenges," Energy & Environmental Science, 2008, 1, 248-267.

* cited by examiner

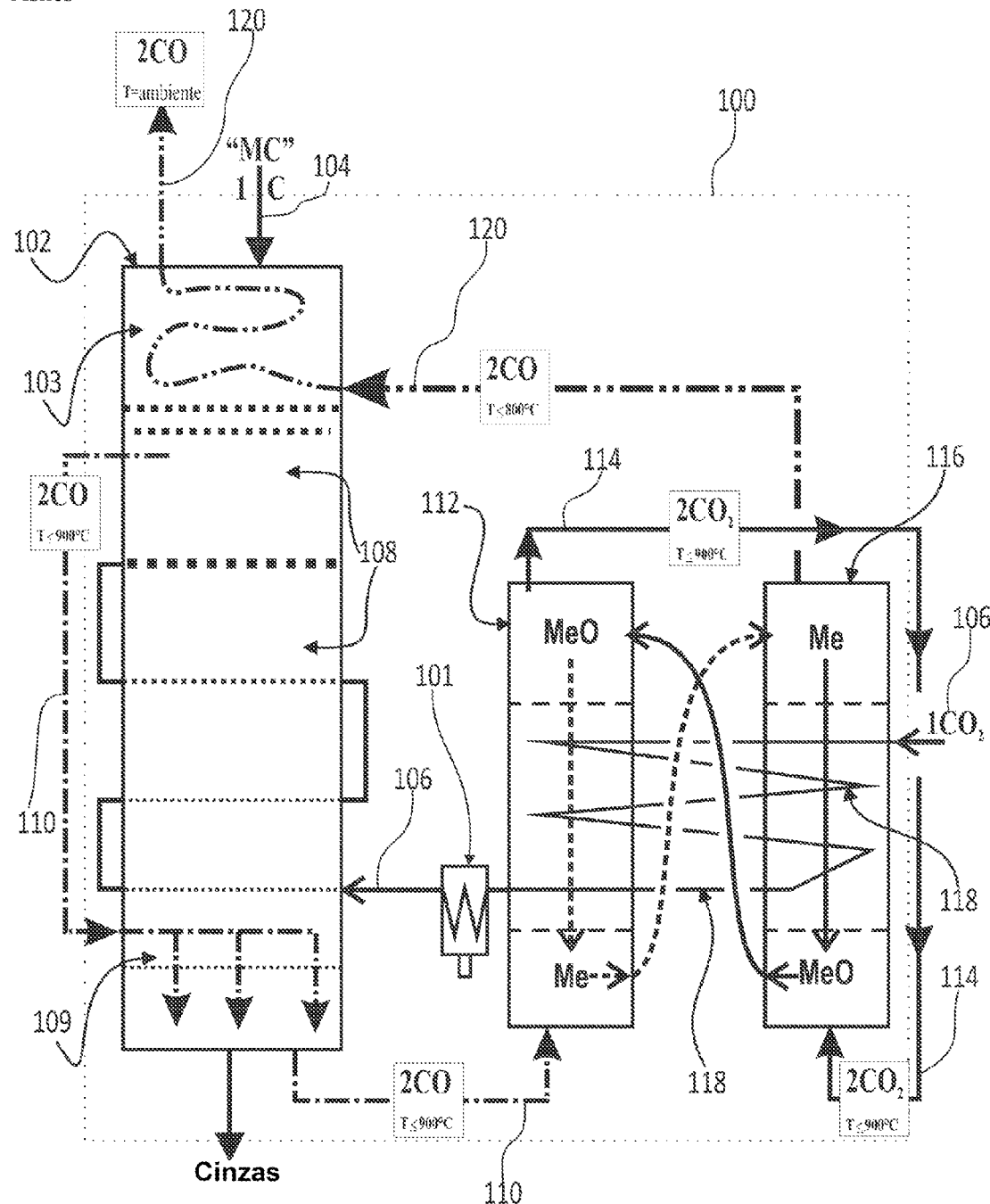

METHOD FOR RECYCLING CARBON DIOXIDE CO₂

This application is a 35 U.S.C. §371 national phase application of PCT/BR2011/000019, which was filed Jan. 17, 2011 and is incorporated herein by reference as if fully set forth.

The present invention refers to a process to recycle carbon dioxide. It also refers to a system performing said process.

The field of the invention is the recycling field of carbon dioxide ($CO_2$), more particularly dioxide reduction by elements of carbon (C). CO is the basic form of the "gaseous carbon" and the chemical base of the whole construction containing carbon. It is also a fuel gas with high heating power, convertible in all the "traditional" energy as currently used.

$CO_2$ reduction by molecules of carbon C in two CO is perfectly known and defined by Boudouard's work. Therefore, at the eyes of the interest of energy transference to the 2 CO, the enthalpy of that endothermal reaction is very important for that operation to be economically feasible. In fact, the reduction of $CO_2$ into CO is endothermal and, as we will see in the following explanation, it requires high temperatures. It is therefore required to supply energy to enable the occurrence of the reaction.

A few decades ago, research has been performed to determine skills to improve the yield of these reactions and only the interferences on the environment justify that certain "gasification" processes come to cause any interest.

Considering the high enthalpy of the $CO_2$ reduction reaction, techniques to concentrate/collect and stock $CO_2$ are being privileged and are better than $CO_2$ recycling process, which are also very expensive and require the use of considerable technical means. An object of the present invention is to avoid these inconveniences.

Another object of the present invention is to propose an economically viable process and system to recycle carbon dioxide.

Therefore, an object of the present invention proposes a process and a system to recycle carbon dioxide with better yielding than the systems of the current state of the art.

The present invention allows to reach these objects by means of a process to recycle a so-called initial gaseous flow of $CO_2$ essentially containing molecules of $CO_2$, said process comprising the following steps:
heating of said gaseous flow of $CO_2$ at a pyrolysis temperature of the material containing carbon;
pyrolysis of a load of a carbon-containing material containing elements of carbon for said gaseous flow, said pyrolysis reducing the molecules of $CO_2$ by said elements of carbon to produce a first gaseous flow essentially containing molecules of carbon monoxide at high temperature;
oxidation of said molecules of carbon monoxide by elements of oxygen, said oxidation producing a second gaseous flow essentially containing molecules of $CO_2$;
reduction of said molecules of $CO_2$ of said second gaseous flow, said reduction supplying a third gaseous flow essentially containing molecules of carbon monoxide (CO).

The present invention performs $CO_2$ deoxidation to obtain CO, a CO oxidation to obtain $CO_2$ and a second deoxidation of $CO_2$ to again obtain CO.

These three reactions allow to sensitively transmit the whole potential power of the materials containing carbons at the start of recycling up to the end of recycling, thus allowing us to use them during the different steps, not requiring external power. Therefore:

the first reaction is a pyrolysis action of the materials containing carbons which purpose is to bring said materials containing carbon to 800/1000° C. This is the temperature of the "oxyreductor" reaction of $CO_2$ by carbon (C), which is oxidized in CO (carbon monoxide) by the exchange of an atom of oxygen (O) coming from $CO_2$. That reaction is endothermal, the useful energy is supplied to the start of the process of the invention, by known means of heating bringing the gaseous flow of $CO_2$ to the pyrolysis temperature of the materials containing carbon. Subsequently, this energy is supplied by recycling the energies as produced by the following reactions and by a complement of heating to compensate the loss of the system. In the sequence of that first reaction, the carbon from the initial materials containing carbons is "gasified" into CO (carbon monoxide) and $CO_2$ is reduced to CO. The resulting gaseous effluent is then essentially composed of CO (fuel gas with high heating power) at the temperature of 1000° C., the maintenance of that temperature is controlled by an eventual heating complement as supplied to the initial $CO_2$.

The second CO oxidation reaction by oxygen holding elements has the object to homogenize thermal capacities and the temperatures of gaseous flows, allowing to supply sufficient energy to bring and keep the oxygen holding elements to their reaction temperature between 800 and 1000° C., perform the second deoxidation of $CO_2$ and increase the temperature of the initial gaseous flow to the pyrolysis temperature. This avoids an excessive supply of external energy, be it to perform the second deoxidation, be it to increase the temperature of the initial gaseous flow.

The third reaction consists in deoxidizing (reducing) $CO_2$ over oxidable elements (which have been reduced in the second reaction) to obtain a final gaseous flow essentially comprising CO at the temperature of 1000° C., assuring useful stability to its transference to the zone of introduction of the organic materials, where it will change its thermal capacity with said materials, without the risk of inverting the reaction (2 CO in the course of reduction of its temperature from 1000° C. to 500° C., are made in 1 $CO_2$+1 C, which reaction is inhibited in the presence of carbon elements so to become "oxyreductors"), which would be probable by lowering its temperature by another way of thermal exchange.

The present invention allows to obtain, from one mole of $CO_2$, two moles of carbon monoxide CO, which is a fuel gas with high energetic power and a useful molecule for numerous molecular arrangements containing carbon.

Recycling of $CO_2$ in CO as per the invention performs: thermal transference of a solid fuel into a gas emitted from the conversion of said solid into almost pure fuel gas with the following possibilities:
better yield and management of gas combustion over solid fuel;
better global yielding of the used energy;
considerably reduced maintenance of thermal devices;
recycling of 3.66 kg of $CO_2$ per kg of solid carbon as consumed: be it in primary molecules (CO), an elementary gaseous form of carbon allowing its linkage to other elements to obtain commonly used molecules of the industry, be them in combustion gas for any thermal system. $CO_2$ may be recycled for numerous times after the combustion of the gaseous flow of carbon monoxide as used.

The process of the invention is an economically viable process.

Furthermore, the yield of the process of the invention is higher, in comparison with the processes of the current state of the art.

In an advantageous version of the process of the invention, the elements of oxygen oxidizing the molecules of carbon monoxide of the first gaseous flow may be supplied by oxygen holding oxides, being said oxygen holders reduced after said oxidation.

Similarly, the reduction of $CO_2$ molecules of the second gaseous flow may be effected by reduced oxygen holders as obtained after the oxidation of carbon monoxide molecules.

Therefore, the same holders of oxygen are used in a closed circuit at each iteration of the process of the invention, wherein each cycle of use of oxygen holders initially comprises a reaction for oxidation of the molecules of carbon monoxide and subsequently a reaction for reduction of carbon dioxide molecules. Oxygen holders are therefore firstly reduced and then oxidized.

An example of oxygen holder may be an oxygen holder based on nickel, such as NiO. During the oxidation of carbon monoxide molecules, the holder of oxygen is reduced into Ni per the following reaction:

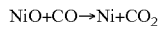

$$NiO + CO \rightarrow Ni + CO_2$$

During the reduction of carbon monoxide molecules, the reduced oxygen holder of oxygen, i. e. Ni, is oxidized per the following reaction:

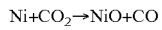

$$Ni + CO_2 \rightarrow NiO + CO$$

The holder of oxidized oxygen, i. e. NiO is subsequently used for a new oxidation of the molecules of carbon monoxide and so on.

The process of the invention comprises a starting phase during which the initial gaseous flow of $CO_2$ is heated by the combustion of a load of material containing carbon. Therefore, the thermal power as initially required to start the oxidation and reduction reactions is provided by this combustion. This combustion can be advantageously performed under oxygen, optimizing the thermal yield of said combustion and producing a combustion gas essentially composed by $CO_2$. Said $CO_2$ is immediately incorporated to the initial gaseous flow, thus performing thermal transference with no loss of power.

After the start of reactions, the process of the invention can advantageously comprise the recovery of at least one part of said thermal power of the second gaseous flow, wherein at least a part of said thermal power is used to heat the initial gaseous flow.

On the other hand, according to an advantageous version, the process of the invention can advantageously comprise the recovery of at least a part of said thermal power of the third gaseous flow, wherein at least a part of said thermal power is used to heat the initial gaseous flow and to pre-heat the materials containing carbons.

The pyrolysis temperature is comprised between 800 and 1100° C. and is preferably 1000° C.

Furthermore, the process of the invention comprises continued feed of dry materials containing carbons by means of a mechanized inlet chamber configured to avoid the entrance of external air. The third gaseous flow as obtained may travel through this inlet chamber so to exchange at least a part of its thermal power with carbon-containing materials, passing through them in counter current. Thus, the thermal exchange is made:
upstream, in benefit of the carbon-containing materials which are then pre-heated by recycling the inherent power of the thermal/chemical reactions in the process of the invention;
downstream, with no loss to the third final gaseous flow. In fact, Boudouard has shown that: if at 1000° C. the reaction is full in 2 CO, on the other hand, while 2 CO at 1000° C. exchange their thermal capacity (heat) with their media, the reaction is inverted to 1 $CO_2$+1 C up to the reduction of the temperature at the stability level of carbon balance, about 450° C., and the transference is almost balanced 50/50% at that temperature. This way, the process of the invention inhibits this reaction inversion by exchanging CO heat (at 1000° C.) with the carbon-containing materials as introduced (which are the stock of "reducing" carbon in the process and react as such to the course of thermal exchange), which inhibit that inversion by reacting instantaneously with the means and balancing temperature at a stability level of carbon monoxide (<450° C.).

Furthermore, the process of the invention may comprise a step of milling of the carbon-containing load before the pyrolysis step. The milling of carbon-containing material allows to benefit pyrolysis and the consequent reduction reaction of $CO_2$ molecules during said pyrolysis.

The third gaseous flow as obtained, essentially comprising carbon monoxide molecules, represents an important source of energy. The process of the invention may comprise a step of generation of electric energy or thermal power by the combustion of at least a part of this third gaseous flow.

According to an example of embodiment, the load of dry material containing carbon may comprise:
plant or animal biomass;
coal;
peat;
lignite;
organic or non organic residues;
worn tyres; or
any mixture of these carbon-containing materials.

Another aspect of the invention proposes a recycling system for a so-called initial gaseous flow, essentially comprising $CO_2$, said system comprising:
heating means for said gaseous flow at a pyrolysis temperature of the material containing carbon;
a first so-called pyrolysis zone, performing the pyrolysis of a load of a carbon-containing material by said gaseous flow at said pyrolysis temperature, said pyrolysis reducing the molecules of $CO_2$ to produce a first gaseous flow essentially comprising molecules of carbon monoxide (CO);
a second so-called oxidation zone, performing the oxidation of said molecules of carbon monoxide, said oxidation producing a second gaseous flow essentially comprising molecules of $CO_2$; and
a third so-called reduction zone, performing the reduction of said molecules of $CO_2$ of said second gaseous flow, said reduction supplying a third gaseous flow essentially comprising molecules of carbon monoxide (CO).

In an advantageous version, the second zone may contain oxygen-bearing oxides providing a supply of elements of oxygen to oxidize the molecules of carbon monoxide of the first gaseous flow, being said oxygen holders reduced after said oxidation.

Always according to an advantageous version, the third zone may contain oxygen bearing oxides in reduced state, performing the reduction of $CO_2$ molecules from the second gaseous flow.

According to a preferred version, the system of the invention may contain transport means performing:
the transference from the second to the third zone of oxygen-bearing oxides in reduced state as obtained after the oxidation of the molecules of carbon monoxide of the first gaseous flow; and
the transference from the third zone to the second zone of oxygen-bearing oxides in oxidized state as obtained after the reduction of $CO_2$ molecules of the second gaseous flow.

These means of transportation allow to use and re-use oxygen bearers during the oxidation reactions of carbon monoxide molecules of the first gaseous flow and reduction of $CO_2$ molecules of the second gaseous flow, following a closed cycle at each iteration of the process of the invention.

The heating means of the initial gaseous flow may contain at least one thermal exchanger performing:
transference of thermal power from the second gaseous flow to the initial gaseous flow; and/or
transference of thermal power from the third gaseous flow to the initial gaseous flow. Such exchanger allows to recover and value the thermal energies of the second and third gaseous flows.

The system of the invention may also have milling means for the load containing carbon before the pyrolysis of that material by the initial gaseous flow to increase the deoxidation reaction of $CO_2$ molecules by the elements of carbon of the load containing carbon.

On the other hand, the system of the invention may contain means to put said system under depression, thus favoring the circulation of the different gaseous flows of the pyrolysis zone to the third zone.

The invention recycles $CO_2$ over a base containing carbon to obtain CO of the reaction: $1 CO_2 + 1 C = 2 CO$ which is a $CO_2$ reducing reaction. This reduction can be partially performed at the thermal level of 400/500° C. and is complete at 1000° C. At this temperature, all $CO_2$ have exchanged ½ $O_2$ with a C. This reduction is endothermal (283 kJ/mole) and we therefore need to supply it with the means of reaction.

The reduction of 1 $CO_2$ by 1 C in 2CO is made by causing two joint reactions:
the reduction by the exchange of ½ $O_2$ (O) in the benefit of one C is endothermal (283 kJ/mole).
the exchange of ½ $O_2$ (O) of $CO_2$ in benefit of 1C in CO is an exothermal oxidation (111 kJ/mole).

The endotherm of reduction of $1CO_2$ by 1C in 2CO is 283 kJ/mole−111 kJ/mole=172 kJ per mole of $CO_2$.

1 kg of $CO_2$ is composed by 22.73 moles (44 g/mole) to reduce them into CO, thus the equivalence in carbon is required: consider 22.73 moles of C (12 g/mole) or 272.76 g of carbon (C). This reaction results in 45.46 moles of CO (28 g/mol), i. e. 1.273 kg of carbon monoxide (CO).

Under these conditions, the power balance of $CO_2$ recycling over C in two CO of the invention is as follows: approximately 1,644 kJ are required to elevate 1 kg of $CO_2$+the equivalent carbon (272.76 g or 6/700 g of a carbon-containing material at 50% carbon) at the base temperature of the reducing reaction (400/500° C.) and approximately 2,220 kJ to reach its full temperature (z 1000° C.). On the other hand, the endotherm of the reduction of 1 kg of $CO_2$ is: 172 kJ×22.73 moles=3,909.56 kJ. The full enthalpy of recycling is 5,554 kJ at 6,130 kJ/kg of $CO_2$. The heating power of 1,273 kg of CO is: 283 kJ/mol×45.46moles=12,865 kJ, i. e. a limited gain between 7,311 kJ and 6,735 kJ/kg of $CO_2$.

The heating power of 272.76 g of carbon useful for $CO_2$ reduction is of 22.73 moles×394 kJ/mol=8,956 kJ.

In conclusion:
the power balance of $CO_2$ recycling into CO consumes power useful to condition the used materials (reaction enthalpy 1644/2220 kJ). As will be explained in the sequence of the process, that power is supplied at the start, by carbon oxidation (combustion) and subsequently by the recycling/recover of latent and sensitive heats over reaction effluents.
The thermal balance of $CO_2$ recycling into CO develops an instantaneous power potential under the form of "perfect" gaseous fuel of more than about 4,000 kJ/kg of $CO_2$ for the combustion of the energy equivalent carbon (solid fuel) used as reducing agent. This state allows to optimize the combustion, yield and combustion temperature, as well as the global power yield.

The general result of $CO_2$ recycling into CO is significant:
optimized thermal transference of a solid fuel to a gas resulting from the conversion of said solid into (almost pure) fuel gas with the following possibilities:
better yield and management of gas combustion than a solid fuel;
better global yield of the used energy;
considerably reduced maintenance of thermal devices;
recycling of 3.66 kg of $CO_2$ per kg of solid carbon as consumed, and the $CO_2$ may be recycled many times after the combustion of the gas solution.

The invention may be used for the production of CO, for the construction of chains containing carbons for molecular combinations and for various industrial applications.

Linked to a hydrogen ($H_2$) production system, the invention, by producing CO, allows all molecular combinations of hydrocarbides, such as methane ($CH_4$). Hydrocarbide compositions with more complex synthesis may then be made in current refinery facilities.

The invention can be equally used for the conversion of the power/source ("thermal" power potential for solid fuels) transformed into a source of combustible gaseous energy (CO) for conversion into new energies with multiple uses: heat, cold, electricity, motor power.

Oxygen holders may contain NiO, $Fe_2O_3$, MgO, CaO, etc.

Other advantages and characteristics of the invention will appear upon the examination of the detailed description of a non-limitative way of embodiment and the attached FIGURE which is a schematic representation of the principle of a first version of a $CO_2$ recycling system over a base containing carbon of the invention.

The system 100 as represented by FIG. 1 comprises a first zone 102. The first zone 102 is the zone where the pyrolysis of materials containing carbons 104 is made by an initial gaseous flow of $CO_2$ 106 at high temperature (higher than 1000° C.). The materials containing carbon are preferably dry for a homogeneous reaction into CO, but can be wet if the object is to obtain the synthesis of a different gaseous compound. This first zone 102 has many levels 108 and is configured to allow:
the progressive increase in temperature of the carbon-containing materials and the maintenance of $CO_2$ at the optimum pyrolysis temperature.
the reaction of disoxidation of $CO_2$ by the carbon-containing material, more particularly carbon elements.

The initial gaseous flow of $CO_2$ 106 and the carbon-containing materials 104 are continuously introduced in this first zone 102 in counter current. $CO_2$ 106 is introduced at the reaction temperature defined at approximately 1000° C. In fact, the initial gaseous flow of $CO_2$ 106 is previously heated at the reaction temperature by the means 101 as known by the experts in the starting phase. Once the reaction is started, the heating of gaseous flow $CO_2$ is autonomous, thanks to the recycle of energies as used by the system 100 as disclosed below.

To perform the reaction of reduction of $CO_2$ (as per the balances of carbon as defined by Boudouard and previously explained) and optimize that reaction, $CO_2$ is pre-heated at a temperature ≥1000° C. before its introduction in controlled proportion as related to the proportion of carbon as contained in raw materials containing carbons 104 introduced to react instantaneously with the means, accelerate the increase in temperature of the carbon-containing materials and inhibit any reaction inversion. Said external pre-heating is interrupted or reduced, as long as the starting phase reaches the level of thermal autonomy in the process. The proportion of $CO_2$ as introduced should be equal to the proportion of carbon (C) in the carbon-containing material, i.e. 1 mole of $CO_2$ for 1 mole of carbon (C).

Carbon-containing materials 104 may be indifferently of plant and/or animal biomass, carbon, peat, lignite, residues, worn tyres, etc. They are preferable milled for better interaction with $CO_2$. They are preferably "dried" to obtain the reaction of the invention. The carbon-containing material is introduced in the first zone 102 of pyrolysis by a chamber 103 (mechanized by devices known by the expert in the art) at its stocking temperature. In that chamber 103, the carbon-containing material is crossed in counter current by the end gaseous flow 120. Said interaction allows to change the residual thermal capacity of the flow 120 with the carbon-containing materials 104, allowing its pre-heating and flow cooling 120. The carbon-containing material is then introduced into the zones 108 where it is submitted in counter current to the initial gaseous flow 106 of $CO_2$ at the pyrolysis temperature of approximately 1000° C. elevating the temperature of the set to the required level by the reaction of deoxidation (reduction) of $CO_2$. Pyrolysis persists, level after level, as a function of the configuration as established for the system. $CO_2$ then exchanges an O with the overheated carbons of the carbon-containing materials 104. The gaseous mixture as obtained passes from one level 108 to another by traveling through an intermediate zone, concomitant to all zones in the system of the invention, within which the different gaseous flows of the process also travel by means of distinct exchangers. Therefore, the gaseous mixture conserves temperature and thermal capacity which are sufficient for the reaction to be effective and efficient. CO molecules are formed to assemble a first gaseous flow 110 essentially comprising CO at high temperature (≤900° C.) to finally make a passage as defined in zone 109, wherein the residual materials containing initial carbons and residual $CO_2$ are fully transformed into CO. This first gaseous flow 110 is pulled from the first zone 102 to a second zone 112, since the system 100 is under depression by known extraction means, not shown.

The second zone 112 uses oxygen-holding materials such as metal oxides indicated as MeO on FIG. 1. By contact with oxygen-holding materials MeO, the first gaseous flow 110 essentially comprising CO at high temperature will oxide by taking off, from oxygen-holding materials, the missing atom(s) of oxygen for its complete combustion. Said exothermal reaction is produced under no flame and generates 12,865 kJ by 1.273 kg of CO produced per kg of carbon-containing materials 104 as introduced in the chamber 103 of the zone 102 (i. e. 45.46 moles of CO). That second zone 112 may be a steam production boiler or any other known thermal generator. In the given example, said second zone 112 is a thermal exchanger in which the initial gaseous flow of $CO_2$ 106 travels and acquires a part of its thermal capacity before its introduction in the first zone 102.

The deoxidation of oxygen-bearing materials MeO is usually an endothermal reaction and, to compensate this endotherm, the first gaseous flow of CO 110 is high at very high temperatures during recycles and thermal exchanges in the process. On the other hand, oxygen-bearing materials MeO are equally pre-heated during thermal recycles in the process.

In the given example, oxygen-bearing materials MeO may comprise a preparation based on nickel "Ni" which is in state of oxide "NiO". In this case, the full reaction: the reduction of NiO and oxidation of CO is exothermal:

$NiO+CO=Ni+CO_2-38.7$ kJ/mole of CO.

This reactions generate a second gaseous flow 114, essentially comprising $CO_2$.

However, the temperature in that second zone 112 should be kept at 1000° C. or lower to preserve the durability of oxygen-bearing materials. The thermal transference of the reaction exotherm against the initial gaseous flow 106 crossing the second zone 112 allowing to keep the temperature of the second zone at 1000° C. or lower. The thermal transference is performed by a thermal exchanger 118 which is common to both zones 112 and 116 or any other thermal recovery means, so that the energy transference, from the reactions to the initial gaseous flow 106, is gradually performed by keeping the optimized temperature of the zones, "oxygen bearing" materials and gaseous flows as considered.

At the time of the full oxidation of CO into $CO_2$ in the second zone 112, the endotherm of the initial $CO_2$ reduction (172 kJ/mole of $CO_2$ during the pyrolysis of the carbon-containing material) is recycled as follows:

"oxygen-bearing" materials MeO are deactivated (or reduced) into Me and are extracted by gravity (and/or mechanically) from the second zone to a temperature comprised between 800 and 1000° C.; these materials Me are transferred by means of transportation to the third zone 116 of the system 100; and the second gaseous flow 114 essentially comprising $CO_2$ exits the second zone 112 at a temperature of 900° C. or lower. This second gaseous flow is introduced at a temperature of less than 900° C. in the third zone 116, where it will be again reduced to CO in contact with deoxidized or reduced oxygen-bearing materials Me coming from the second zone 112 and conducted to the third zone 116.

In the third zone 116, the second gaseous flow 114 coming from the second zone 112 will cross deactivated or reduced oxygen-bearing materials Me with which the compounds of $CO_2$ will exchange an atom of oxygen as per the reaction:

$CO_2+Me=CO+MeO$

On the other hand, this reaction generates:
a third gaseous flow 120 essentially comprising CO at a temperature of 800° C. or less; and
activated or oxidized oxygen-bearing materials MeO which may be re-used in the second zone 112.

In the present example, this reaction is written as follows:

$CO_2+Ni=CO+NiO+38.7$ kJ/mole of $CO_2$.

The endotherm of that reaction nulls the exotherm of the one effective in the first zone. The thermal exchanger 118 for transport of the initial gaseous flow 106 also occupies this third zone 116. The initial gaseous flow 106 of $CO_2$ circulates in this thermal exchanger 118 from the third zone to the first zone, countercurrently, to reach the maximum thermal capacity and the temperature of about 1000° C. useful to the set of reactions as disclosed.

The third gaseous flow 120 is extracted from the system 100 through the chamber 103 where it will go through the carbon-containing material which is therein continuously introduced. The meeting and interaction of the third gaseous flow 120 and the carbon-containing material 104 in counter current previously heats the carbon-containing material and refrigerates the third gaseous flow 120 by inhibiting all the inversion of CO molecules in 1 $CO_2$+1 C.

The thermal balance of said reactions is in deficit. It requires a thermal supply corresponding to the various losses in the system (about 10% as per the disclosed example) and the residual thermal capacity of the flow 120 (if not used "as such" since its extraction from the system of the invention). Said thermal complement may be supplied upstream by a strictly controlled thermal supply, consuming (in oxycombustion) CO in the device 101 for initial $CO_2$ pre-heating 106, being said CO molecules transformed in $CO_2$ which will then be recycled in the system.

The third gaseous flow 120 of CO which is extracted from the third zone 116 is a burning gas which may be used "as such" in any thermal installations and/or converted into electricity in a motor and/or gas turbine. CO molecules composing this third gaseous flow 120 may be used as primary molecules for the combination of carbonated molecular complexes of synthesis and, concerning supply and/or production of hydrogen ($H_2$) in hydrocarbon molecules.

In conclusion:

at the inlet of the system 100, 1 mole of $CO_2$ and 1 mole of carbon (in the form of various carbon-containing materials, which may be coal) are introduced.

$CO_2$ serves as a thermal owner ("heat sensitive" energy carrier) useful to pyrolysis in the first zone 102;

carbon at an energy potential at 394 kJ/mol;

in the outlet, the system generates 2 moles of CO with a power potential of 283 kJ/mole×2=566 kJ, i. e. a power gain of 172 kJ useful for the transference of power of C at 2 CO by reduction of the initial $CO_2$. This power is supplied at the start of the reaction by a supply of external power and is recovered in the reaction cycle of the system after the starting phase. Only a minimum consumption of the primary reaction remains and the compensation of the thermal losses inherent to the used devices.

The global yield of the process of the invention is therefore of more than 90%. Consider about 510 kJ, the sum of the power transference from C and $CO_2$ conversion, from where the power potential gain (to produced CO and the process is defined for thermal use of said CO) of 116 kJ per mole of initial $CO_2$ and saving of 116/394 kJ/mole of $CO_2$=29.44% of recovered supplementary power thanks to the recycle of the produced power, i. e. less 29.44% of atmospheric $CO_2$ rejects (GES). Consider 1 mol of carbon dioxide ($CO_2$, GES) recycled per mole of carbon as used to produce two moles of industrial CO, with no gaseous discharge to the atmosphere.

It is well understood that the invention is not limited to the examples as disclosed above.

What is claimed is:

1. A process to recycle a gaseous flow (106) of $CO_2$, essentially comprising molecules of $CO_2$, said process comprising the following steps:

heating of said gaseous flow of $CO_2$ at a pyrolysis temperature of a carbon containing material in a range between 800 and 1100° C.;

milling a load of the carbon containing material before the pyrolysis step;

pyrolysis of the load of the carbon-containing material by said gaseous flow, said pyrolysis reducing the $CO_2$ to produce the first gaseous flow essentially containing carbon monoxide (CO) at high temperature;

oxidation of said monoxide (CO) by oxygen (O) of the oxygen holding oxides, MeO, wherein Me is a metal, said oxidation producing a second gaseous flow essentially containing molecules of $CO_2$, wherein said oxygen holding oxides (MeO) are reduced (Me) after said oxidation;

reduction of said molecules of $CO_2$ of said second gaseous flow by the reduced oxygen holding oxides (Me) obtained after oxidation of carbon monoxide (CO), said reduction supplying a third gaseous flow essentially containing molecules of carbon monoxide (CO).

2. The process of claim 1, further comprising a starting phase during which the step of heating of said gaseous flow of $CO_2$ is performed by the combustion of a load of carbon containing material.

3. The process of claim 1, further comprising the recovery of at least a part of the thermal power of the second gaseous flow, being at least a part of said thermal power in the step of heating said gaseous flow of $CO_2$.

4. The process of claim 1, further comprising the recovery of at least a part of the thermal power of the third gaseous flow, being at least a part of said thermal power used in one or more of the step of heating said gaseous flow of $CO_2$ or to pre-heat the carbon containing material (104).

5. The process of claim 1, further comprising a continuous and counter current introduction of the carbon containing material and said gaseous flow of $CO_2$ in a pyrolysis zone, respecting the proportion of one mole of carbon (C) for one mole of carbon dioxide ($CO_2$).

6. The process of claim 1, further comprising the generation of electric energy or thermal power by combustion of at least a part of the third gaseous flow.

\* \* \* \* \*